United States Patent
Liu et al.

(10) Patent No.: US 10,547,673 B2
(45) Date of Patent: Jan. 28, 2020

(54) DATA AND TASK REALLOCATION IN DISTRIBUTED COMPUTING PLATFORMS

(71) Applicant: INTERNATIONAL BUSINESS MACHINES CORPORATION, Armonk, NY (US)

(72) Inventors: Liang Liu, Beijing (CN); Zhuo Liu, Beijing (CN); Junmei Qu, Beijing (CN); Wei Zhuang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 256 days.

(21) Appl. No.: 15/428,439

(22) Filed: Feb. 9, 2017

(65) Prior Publication Data
US 2018/0227240 A1    Aug. 9, 2018

(51) Int. Cl.
*H04L 29/08* (2006.01)

(52) U.S. Cl.
CPC ................................. *H04L 67/1029* (2013.01)

(58) Field of Classification Search
CPC ......... H04L 47/70; H04L 67/10; H04L 67/42; H04L 43/16; H04L 41/0886; H04L 41/5006; H04L 41/5054; H04L 41/0806
See application file for complete search history.

(56) References Cited

U.S. PATENT DOCUMENTS

| | | | |
|---|---|---|---|
| 8,219,997 B2 * | 7/2012 | Shimizu | G06F 9/5066 718/104 |
| 2013/0191843 A1 * | 7/2013 | Sarkar | G06F 9/505 718/105 |
| 2016/0098292 A1 * | 4/2016 | Boutin | G06F 9/505 718/104 |

* cited by examiner

*Primary Examiner* — Kim T Nguyen
(74) *Attorney, Agent, or Firm* — Cantor Colburn LLP; Joseph Petrokaitis

(57) ABSTRACT

Technical solutions are described for optimizing operation of a server cluster. An example method includes receiving a job request that executes using a set of data blocks, the job request being associated with an expected completion time. The cluster server is used to identify a set of replica servers, wherein each server from the set of replica servers contains the set of data blocks. In response to each server from the set of replica servers estimating a completion time for the job request that is more than the expected completion time, a new server is initiated, the set of data blocks is relocated from a first server from the set of replica servers to the new server, and the job request is allocated to the new server.

20 Claims, 9 Drawing Sheets

DATA AND TASK REALLOCATION IN DISTRIBUTED COMPUTING PLATFORMS

BACKGROUND

The present application relates to computing technology, and more specifically, to a distributed computing server that includes multiple computing nodes.

Platform as a service (PaaS) is a category of cloud computing services that provides a platform for allowing customers to develop, run, and manage computer applications without the complexity of building and maintaining the infrastructure typically associated with developing and launching the applications.

For example, cloud computing is a model of service delivery for enabling convenient, on-demand network access to a shared pool of configurable computing resources. In this regard, shared resources may be provided to computers and other devices as a utility over a network, such as a private network and/or a public network (e.g., the Internet). The resources can include computation/processing, software applications, data access, data management and data storage. End users need not know the specific location or other details of a cloud infrastructure. Nonetheless, end users can access cloud based applications through a web browser or a light weight desktop or mobile application, while business software and data can be stored in the cloud.

SUMMARY

According to one or more embodiments of the invention, a method for optimizing operation of a server cluster includes receiving a job request that executes using a set of data blocks, the job request being associated with an expected completion time. The cluster server identifies a set of replica servers, wherein each server from the set of replica servers contains the set of data blocks. In response to each server from the set of replica servers estimating a completion time for the job request that is more than the expected completion time, initiating a new server, relocating the set of data blocks from a first server from the set of replica servers to the new server, and allocating the job request to the new server.

According to one or more embodiments of the invention, a system includes a server cluster configured to receive a job request that executes using a set of data blocks, the job request being associated with an expected completion time. The server cluster is further configured to identify a set of replica servers, wherein each server from the set of replica servers contains the set of data blocks. In response to each server from the set of replica servers estimating a completion time for the job request that is more than the expected completion time, the server cluster initiates a new server, relocates the set of data blocks from a first server from the set of replica servers to the new server, and allocates the job request to the new server.

According to one or more embodiments of the invention, a computer program product for executing a job request by a server cluster includes a computer readable storage medium having program instructions embodied therewith. The program instructions are executable by a processor to cause the processor to perform a method that includes receiving a job request that executes using a set of data blocks, the job request being associated with an expected completion time. The processor identifies, using the cluster server, a set of replica servers, wherein each server from the set of replica servers contains the set of data blocks. In response to each server from the set of replica servers estimating a completion time for the job request that is more than the expected completion time, the processor initiates a new server, relocates the set of data blocks from a first server from the set of replica servers to the new server, and allocate the job request to the new server.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
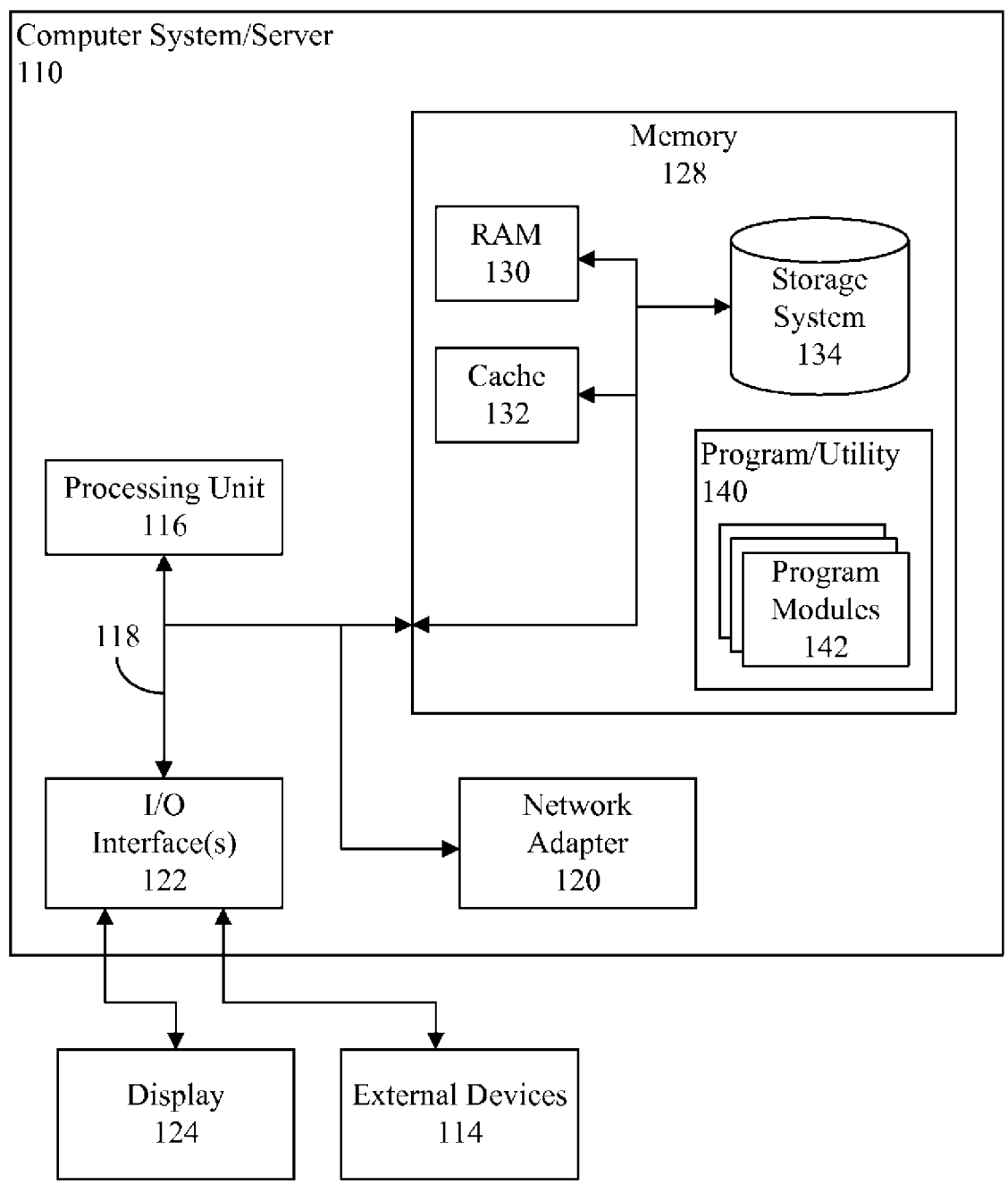
FIG. 1 illustrates a block diagram of an example of a cloud computing node according to one or more embodiments.

Described here are technical solutions that address a technical problem of resource and data allocation in a computing system, such as a cloud-computing environment that can include a distributed computing server. The technical solutions are rooted in and/or tied to computer technology in order to overcome a problem specifically arising in the realm of computers, specifically cloud-computing platform. For example, a client or a user of the cloud-computing platform typically provides performance requirements. However, the user requesting execution of the application on the cloud-computing platform usually does not know and is not concerned with how many resources need to be provided to the application in order to satisfy the performance requirements. For example, the user may not be aware of how many servers can satisfy the users' performance requirements. The technical solutions described herein address the resource allocation, and further facilitate moving tasks and data from one server to another within the cloud-computing platform to ensure that the performance requirements are met. The technical solutions further take into consideration a cost for a supplier of the cloud-computing platform so that the suppliers' cost is optimized while satisfying the performance requirements.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. The cloud computing node 100 is only one example of a suitable cloud computing node and is not intended to suggest any limitation as to the scope of use or functionality of embodiments of the invention described herein. Regardless, the cloud computing node 100 is capable of being implemented and/or performing any of the functionality set forth hereinabove.

The cloud computing node 100 can include a processing system/server 110, which is operational with numerous other general purpose or special purpose computing system environments or configurations. Examples of well-known computing systems, environments, and/or configurations that may be suitable for use with processing system/server 110 include, but are not limited to, personal computer systems, server computer systems, control nodes, storage area network (SAN) controllers, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The processing system/server 110 may be described in the general context of computer system executable instructions, such as program modules, being executed by a computer system or other processing system. Generally, program modules may include routines, programs, objects, components, logic, data structures, and so on that perform particular tasks or implement particular abstract data types. The processing system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the processing system/server 110 in the cloud computing node 100 is shown in the form of a general-purpose computing device. The components of the processing system/server 110 may include, but are not limited to, one or more processors or processing units 116, a system memory 128, and a bus 118 that couples various system components including system memory 128 to the processor 116.

The bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The processing system/server 110 typically may include a variety of computer-readable storage media. Such media may be any available media that is accessible by the processing system/server 110, and it includes both volatile and non-volatile media, removable and non-removable media. System memory 128 can include computer-readable storage media in the form of local memory (e.g., volatile memory), such as random access memory (RAM) 130 and/or cache memory 132. The processing system/server 110 may further include other removable/non-removable, volatile/non-volatile computer-readable storage media. By way of example only, a storage system 134 can be provided for reading from and writing to at least one non-volatile computer-readable storage media. Examples of computer-readable storage media can include, but are not limited to, a data storage device that comprises non-volatile magnetic media (e.g., a "hard disk drive" or "HDD"), a data storage device that comprises non-volatile solid state media (e.g., a "solid state drive" or "SSD"), a data storage device that comprises non-volatile magneto-optical media, and the like. Although not shown, a magnetic disk drive for reading from and writing to a removable, non-volatile magnetic disk (e.g., a "floppy disk"), an optical disk drive for reading from or writing to a removable, non-volatile optical disk such as a CD-ROM, DVD-ROM or other optical media, a solid state drive for reading from or writing to a removable, non-volatile, solid state drive can be provided. In such instances, each can be connected to the bus 118 by one or more data media interfaces, such as a fiber channel interface, a serial advanced technology attachment (SATA) interface, fiber channel interface, a small computer system interface (SCSI) interface, a serial attached SCSI (SAS) interface, or the like.

The memory 128 may include at least one computer program product that includes a computer-readable storage medium having computer-readable program code embodied therewith. The "computer-readable storage medium" can be non-transitory in nature. The computer-readable program code can include a set (e.g., at least one) of program modules 142 that are configured to carry out the functions of embodiments of the invention. The program/utility 140, having a set (at least one) of program modules 142, may be stored in the memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein The processing system/server 110 may also communicate with one or more external devices 114 such as a keyboard, a pointing device, a display 124, etc.; one or more devices that enable a user to interact with processing system/server 110; and/or any devices (e.g., network card, modem, etc.) that enable processing system/server 110 to communicate with one or more other computing devices. Such communication can occur via Input/Output (I/O) interfaces 122. Still yet, the processing system/server 110 can communicate with one or more networks such as a local area network (LAN), a general wide area network (WAN), and/or a public network (e.g., the Internet) via network adapter 120. As depicted, the network adapter 120 can communicate with the other components of the processing system/server 110 via the bus 118. It should be understood that although not shown, other hardware and/or software components could be used in conjunction with the processing system/server 110. Examples, include, but are not limited to: microcode, device drivers, redundant processing units, external disk drive arrays, RAID systems, tape drives, and data archival storage systems, etc.

Figure 2:
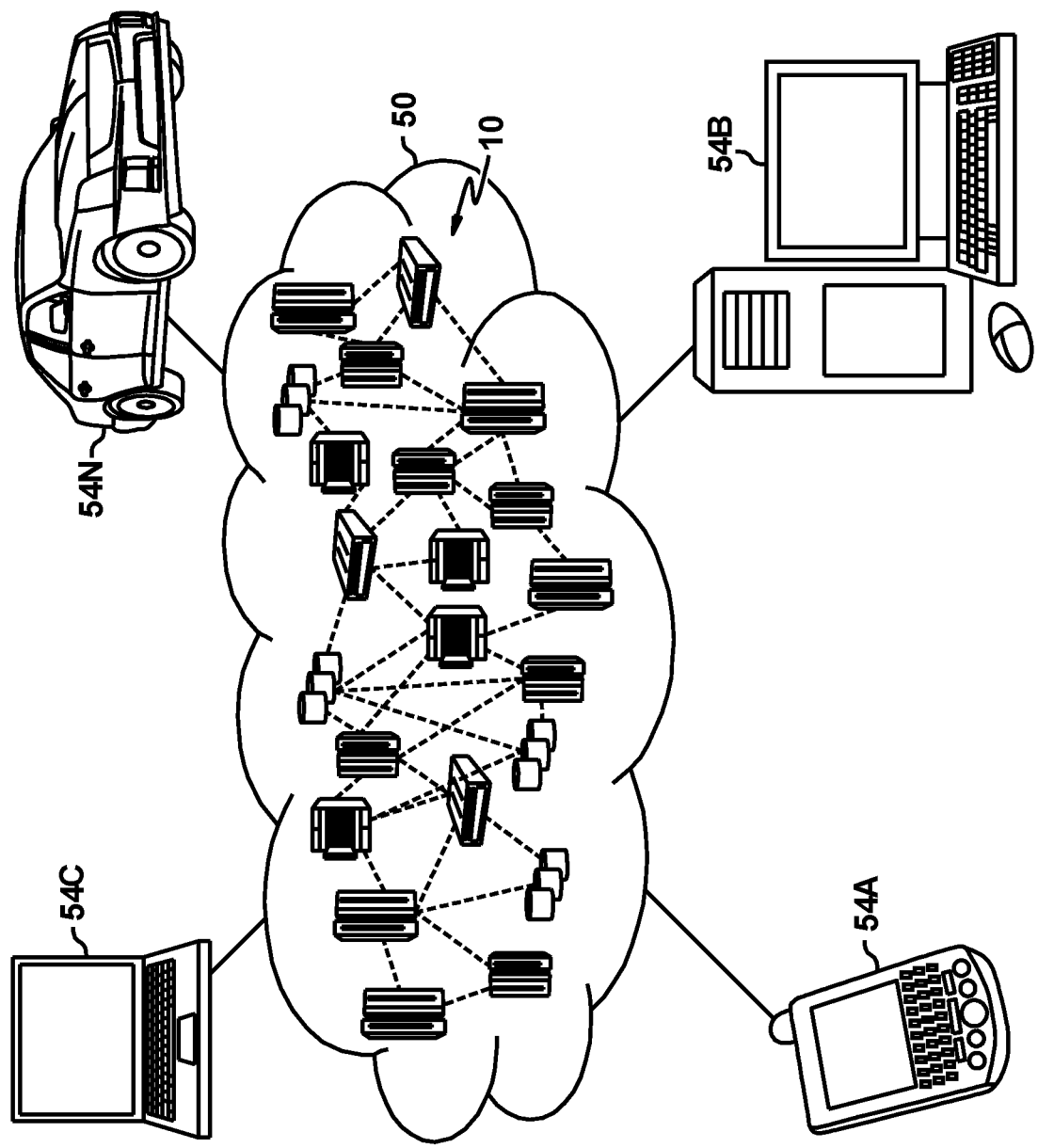
FIG. 2 illustrates a cloud computing environment n according to one or more embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
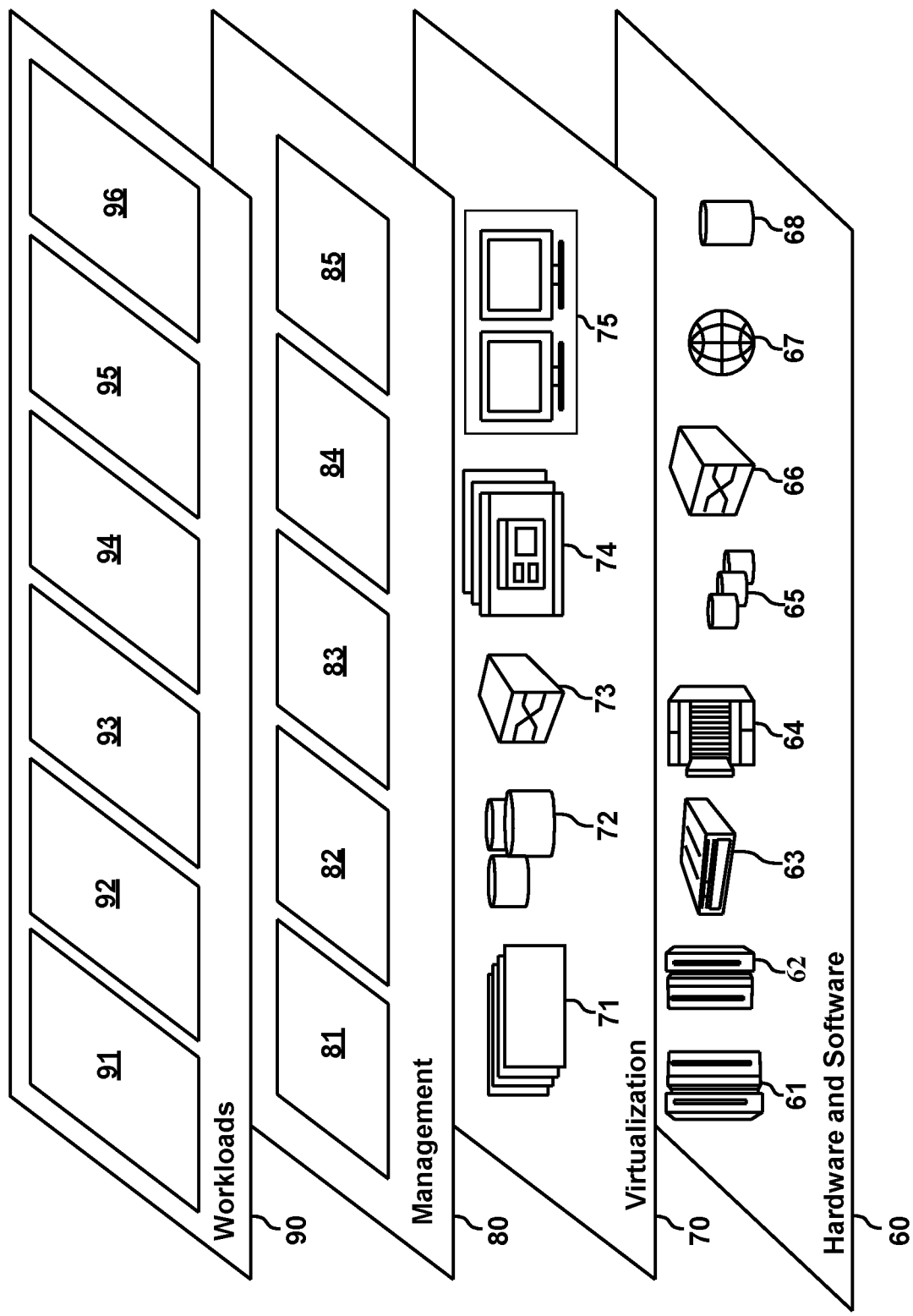
FIG. 3 illustrates functional abstraction layers provided by cloud computing environment according to one or more embodiments.

Referring now to FIG. 3, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data and transaction management 96. Still, the workloads layer 308 can include any other applications and/or workloads suitable to be deployed in a cloud computing environment, and the invention is not limited in this regard.

Figure 4:
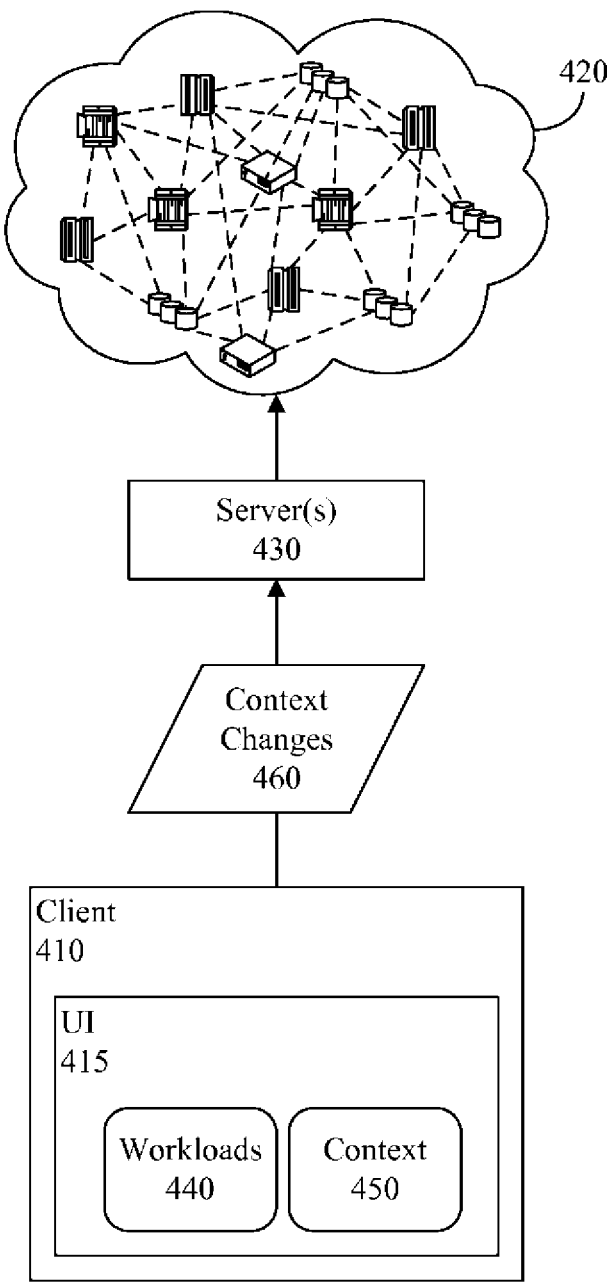
FIG. 4 illustrates a client-server system according to one or more embodiments.

FIG. 4 depicts an example client-server system 400 according to one or more embodiments of the technical solutions described herein. The system 400 can include a client 410 communicatively linked to a cloud 420, for example via a processing system including at least one processor and at least one memory, such as a server 430. In this regard, the server 430 can implemented in accordance with the description of the processing system/server 110 of FIG. 1, and the processor/memory can be configured to perform the functions described herein as being performed by the server 430.

In one embodiment, a server 430 can be communicatively linked to the cloud 420 (or a virtual cloud), via a suitable communication network, for example a public network, such as the Internet, and/or a private network, such as a local area network (LAN) a wide area network (WAN), or the like. In another embodiment, a server 430 can be a node within the cloud 420, a node within another cloud, or a node within a virtual cloud. Further, one or more servers 430 can be tasked with performing the functions described herein as being performed by the "server" 430. Regardless of whether the server(s) 430 is a cloud note or are cloud nodes, the client 410 can be communicatively linked to the server(s) 430 via a public network and/or a private network. For simplicity, the remainder of the specification will refer to the server 430, though it will be understood by those skilled in the art that a plurality of servers 430 can be used.

As used herein, the term "client" means a processing device or system, such as a workstation, desktop computer, mobile computer, tablet computer or the like that resides client-side in a client/server(s) relationship. In this regard, the client 410 can include at least one processor and memory configured to perform the methods described herein as being performed by the client 410. The client 410 further can include other components/devices and/or peripherals, as would be understood by one skilled in the art. For example, the client 410 can include a suitable display (not shown), incorporated into the client 410, or otherwise communicatively linked to the client.

In one arrangement, the user interface 415 can be visually presented by the client 410 on the display. The user interface 415 can be configured to present on the display one or more workloads and receive one or more user inputs to change a service level agreement of at least one of the workloads. In another arrangement, the user interface 415 can be presented by the client using a text-to-speech application that generates output audio signals related to the user interface 415 via a suitable output audio transducer embodied within the client 410 and/or coupled to the client 410 as a peripheral device. In such arrangement, the user interface 415 can receive audible user inputs (e.g., spoken utterances) via a microphone within the client 410 and/or coupled to the client 410 as a peripheral device. As used herein, the term "workload" means a unit of work to be performed by one or more computing resources. Such computing resources may be provided by a cloud. Accordingly, a workload also may be referred to as a "cloud asset."

The server 430 can host a user portal (or client portal) via which the client 410 can interface with the server 430 to provide to present a list of one or more workloads 440 allocated to the cloud 420 or the virtual cloud, and present context for service level agreements related to such workloads 440. The workloads 440 can be workloads that are associated with the client 410, or a user (e.g., person) who is logged into the client 410. In illustration, the user can be an administrator tasked with managing certain workloads 440 (e.g., via user name/password or other suitable association), and when the user interface 115 is presented by the client 410, such workloads 440 and corresponding context 450 for service level agreements and/or security levels can be presented by the user interface 225 at the behest of the user.

In one or more examples, the user selects to change the context 150 of one or more particular workloads 440 via a user interface 415, for example by selecting button or icon and selecting a desired service level agreement, the client 410 can communicate to the server 430 a context change 460 for an associated workload 440. Further, the user can change the context of one or more additional workloads in a suitable manner, if desired, and context changes 460 for the associated workloads 440 can be communicated to the server 430.

Referring to FIG. 4, in response, to the user selecting a change of context, the context changes 460 can be communicated from the client to the server 430, and the server 430 can change the service level agreement(s) and/or security levels implemented for such workload(s) 440. For example, for a particular workload 440, the service level agreement can be changed from a first service level agreement to a second service level agreement, and or the security level can be changed from a first level of security to a second level of security. Notably, the workloads 440 can remain active while the changes in service level agreements/security levels are implemented. In other words, services provided by and/or for the workloads 440 need not be stopped to implement a change in service level agreement and/or security level indicated by the context changes 460.

The workloads 440 can include one or more deployment units. As used herein, the phrase "deployment unit" means an asset of a workload. In illustration, a deployment unit 412 can be an executable application, process or function, cohesive data, or the like. In illustration, the workload 440 can include a deployment unit 412 that is an executable application, and a deployment unit 412 that includes data executed by the application, for example one or more data tables. The invention is not limited to these specific examples, however. As discussed herein, various embodiments of reallocating workloads are discussed. These embodiments also can include reallocating deployment units. For instance, a particular deployment unit of a workload 440 can be allocated to a particular node of a cloud, or host, while another deployment of the workload 440 can be allocated to another node of a cloud, or host. Accordingly, when reviewing the following description, it will be understood that when a workload is described as being reallocated, a particular deployment unit of the workload can be reallocated, while other deployment units need not be reallocated, or can be reallocated to different nodes or hosts. In this regard, the term "workload" is used in the following description and in the claims that follow as a general term that covers a plurality of deployment units of a workload and a single deployment unit of a workload, though the workload can include other deployment units that are not reallocated or reallocated in a different manner.

The service level agreement changes and/or security level changes can be implemented in any suitable manner. For example, for a particular workload 440, the cloud 420 (or virtual cloud) can dynamically reallocate the workload 440 from a first server to a second server within the cloud or virtual cloud. The first and/or second servers can be respective machines, for example respective nodes within one or more clouds, or virtual servers.

As used herein, the term "virtual server" means a virtual machine executing a suitable server operating system. A virtual machine is an isolated guest operating system installation within a normal host operating system. For example, an operating system may host one or more virtual servers. Nonetheless, each virtual server may function independently of other virtual servers that may be hosted on by the operating system.

To dynamically reallocate the workload 440 from the first server to the second server, in one embodiment, data of the workload 440 can be moved from local memory allocated to the first server to local memory allocated to the second server. For example, if the servers are individual machines, respectively, the data can be moved from a first machine's local memory to a second machine's local memory. If the servers are virtual servers executing on the same machine, the data can be moved from memory allocated to the first virtual server to memory allocated to the second virtual server. Notably, movement of data from a first local memory to a second local memory can be implemented very quickly. Accordingly, an end user or process that is accessing the workload may not be aware that the workload has been reallocated. Nonetheless, if the workload is reallocated to a server that provides a higher level of service or different level of security, the end user or process may notice improved performance (e.g., faster processing times, higher input/output bandwidth, lower latency, lower jitter, higher mean time between failures, lower mean time to repair, lower mean time to recovery, etc.) or a different level of security being implemented.

In another embodiment, to dynamically reallocate the workload 440 from the first server to the second server, the data of the workload can be moved from a first computer-readable storage medium allocated to the first server to a second computer-readable storage medium allocated to the second server. Moving the data from one storage medium to another may entail moving the data from one physical storage device or array to another, or moving the data from one partition in a storage device or array to another partition of the storage device or array. Moving the data from one storage medium to another can change the performance related to data transfer, though this need not be the case. For example, a particular storage medium may provide improved input/output bandwidth and/or latency compared to another storage medium.

The first and second servers may be contained in the same cloud 420, or may be contained in different clouds. In this regard, the first and second servers can be defined within respective clouds, and the respective clouds both can be defined within a virtual cloud.

The context changes 460 can cause a particular workload 440 to be reallocated from a first server to a second server for any number of reasons. For example, when a context change 460 for a workload 440 is implemented, the first server to which the workload 440 is allocated, and the service level agreement provided by that server can be identified. If the service level agreement provided by that server does not satisfy the new service level agreement indicated by the context change 460, a new server that complies with the new service level agreement can be identified and the workload 440 can be transferred to that new server.

If the service level agreement provided by the present server does satisfy the new service level agreement identified in the context change 460, in response to the context changes 460, the server can change the level of service that the server provides to the workload 440. In another embodiment, the server can be automatically re-configured to comply with the indicated level of service. For example, at least one other workload on server can be reallocated from the server to another server to reduce a total number of workloads allocated to the server The technical solutions described herein facilitate relocating data (in addition to tasks) among servers in a cloud-computing platform that has replica servers. A replica server is a server that has a redundant copy of the data as an original server, for example for fault-tolerance, accessibility, improved reliability, and the so on. In one or more examples, the cloud-computing platform includes a set of replica servers, where at least three servers 430 store copies of a data block. It should be noted that in other examples, the number of replica servers may be a different predetermined number. For example, if a first server 430A includes a data block, at least a second server 430B and a third server 430C include copies of the data block. For example, the cloud-computing platform may use a SPARK™ based processing engine to run HADOOP™ clusters.

Further, in one or more examples, the cloud-computing platform that implements the technical solutions described herein use a resilient distributed dataset (RDD) for storing the data blocks. The RDD is a fault-tolerant collection of elements that can be operated on in parallel, even across multiple servers. The cloud-computing platform, in one or more examples, supports two types of operations on the RDDs: transformations, which create a new dataset from an existing one, and actions, which return a value to a driver program (or execution engine) after running a computation on the dataset. For example, map is a transformation that passes each dataset element through a function and returns a new RDD representing the results. On the other hand, reduce is an action that aggregates all the elements of the RDD using a function and returns the final result to the driver program. Further yet, the cloud-computing platform herein facilitates data persistence, which helps saving interim partial results so they can be reused in subsequent stages of execution. The interim results are stored as RDDs, and kept in memory (default) or more solid storages like disk and/or replicated, so that the interim results can be reused.

Figure 5:
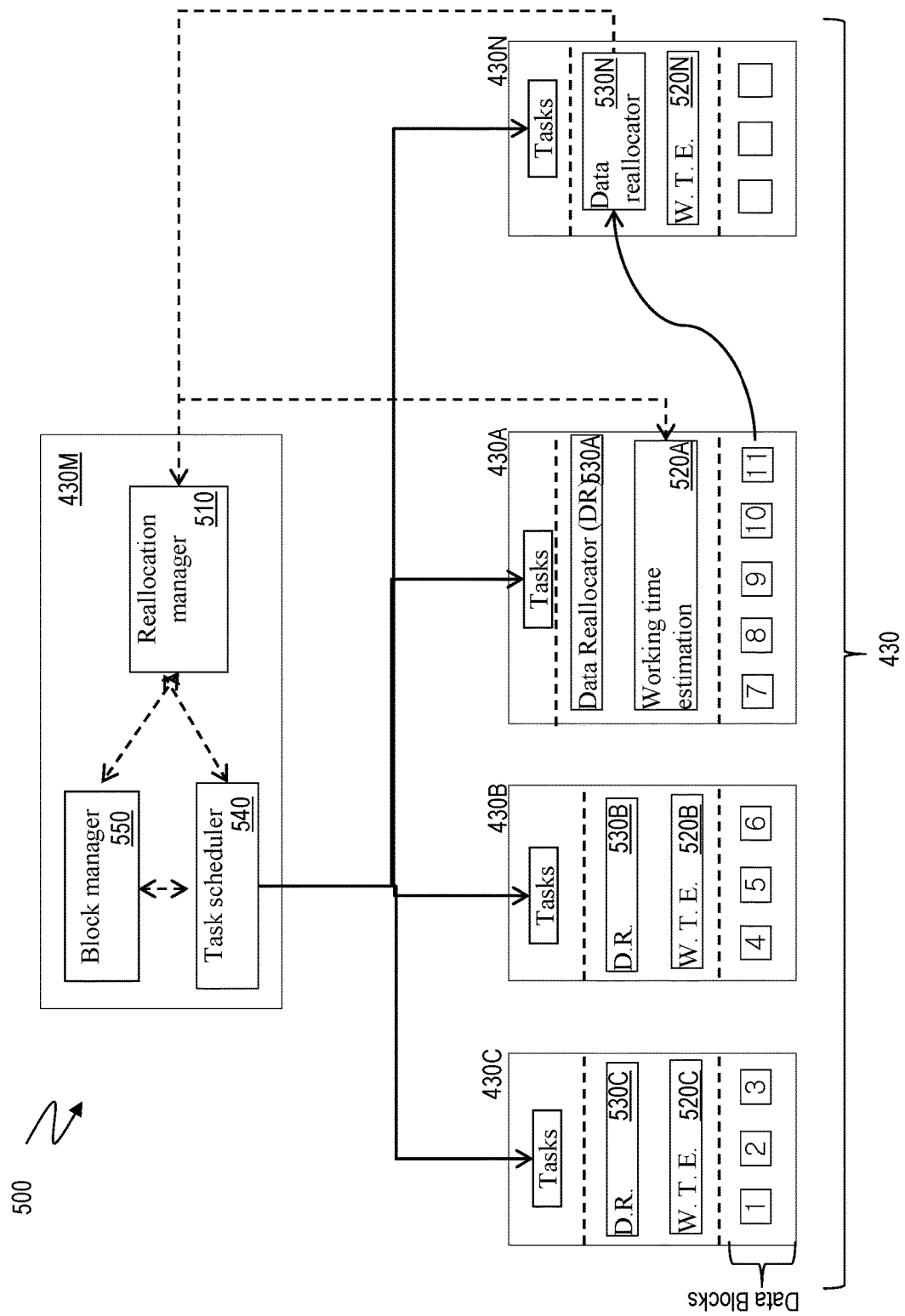
FIG. 5 illustrates an example block diagram of a cloud-computing platform according to one or more embodiments.

FIG. 5 illustrates an example block diagram of a cloud-computing platform 500 for implementing the technical solutions described herein. The cloud-computing platform 500 includes multiple servers 430 that receive one or more job requests from the client 410. The servers 430 are configured to work in a cluster, such as a SPARK™ cluster for executing tasks from a job request in parallel using RDD data blocks. In one or more examples, the servers 430 include a task manager 430M that interfaces with the client 410. Further, the cloud-computing platform has a predetermined number of servers in a replica set. In the examples herein, the predetermined number is three, however it should be noted that other examples may use a different number of replica servers.

For example, FIG. 5 illustrates a first server 430A, a second server 430B, and a third server 430C, that are part of a set of replica servers. The cloud-computing platform 500, for example via the task manager 430M, may initiate a new server 430N if the existing servers 430 in the cluster are unable to meet performance requirements specified by the client 410. In one or more examples, initiating the new server 430N may include adding a new physical server to the cluster. Alternatively, or in addition, initiating the new server 430N may include instantiating a virtual server as part of the cluster.

In one or more examples, the task manager 530M includes one or more components including a reallocation manager module 510, a task scheduler module 540, and a block manager module 550. The task manager 430M may be any one of the server from the cloud-computing platform 500. In one or more examples, each of the servers 430 in the cloud-computing platform executes a respective work time estimation module 520A-N and a respective data reallocator module 530A-N.

Figure 6:
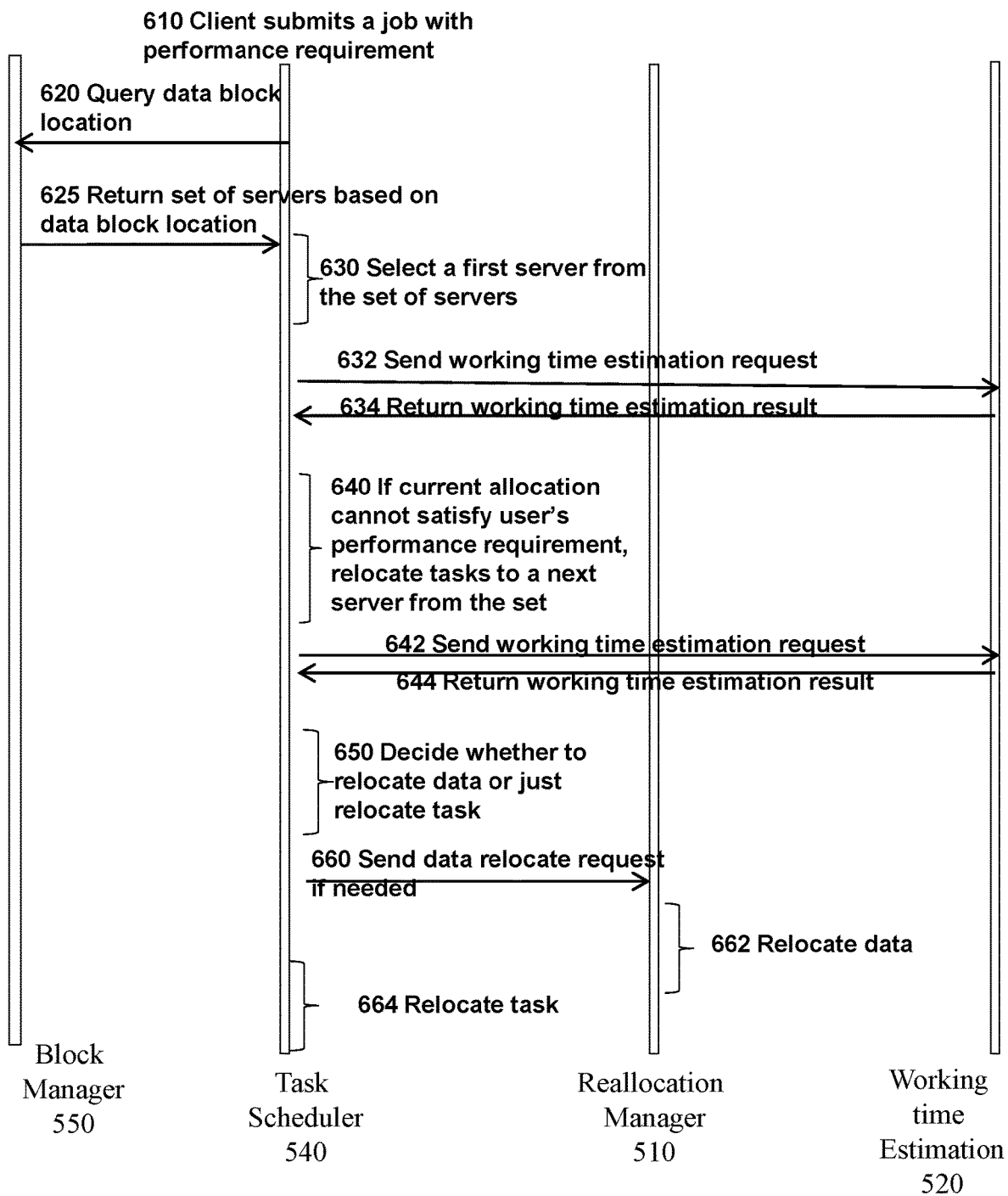
FIG. 6 illustrates a sequence diagram depicting an example method for relocating one or more tasks and/or data blocks associated with a workload according to one or more embodiments.

The task manager 430M receives the request to execute a job request from the client 410, and determines which server(s) 430 execute the task. The job request includes one or more tasks that are based on one or more data blocks. FIG. 6 illustrates a sequence diagram depicting an example execution of a method for relocating the one or more tasks and/or data blocks associated with the job request. For example, the client 410 submits a job with an associated performance requirement, such as a time limit in which the job is to be completed, as shown at 610. The task manager 430M receives the job request and the performance requirement. In one or more examples, the task manager 430M divides the job into one or more tasks. Alternatively, the job from the client 410 is a single task.

The task scheduler module 540 determines which servers 430 to use for the one or more tasks from the job. In one or more examples, the task scheduler module 540 identifies a set of replica servers that include the data blocks for the task by querying the block manager module 550. Herein, a server including a data block indicates that the server has that data block in memory/storage. The set of replica servers that include the data blocks may include a predetermined number of servers, for example three in case of a SPARK™ based platform. The example described further uses the SPARK™ based platform that stores three copies of a data block, however it is understood that any other platform may implement the technical solutions described herein, by configuring the number of replica servers. Accordingly, in the example cloud-computing platform that uses SPARK™, the block manager module 550 identifies to the task scheduler module 540 the three replica servers with the copy of the data block for the task as the set of replica servers, as shown at 625.

The task scheduler module 540 selects one of the servers 430 from the set of replica servers based on a task scheduling policy, as shown at 630. For example, a first server 430A that has least number of tasks scheduled may be selected. Alternatively, the first server selected may be the server that has a faster processor, or more available memory, or the like.

Once the first server is selected, the task scheduler module 540 allocates the task to the first server from the set of replica servers. Further, the task scheduler module 540 sends a work time estimation request to the working time estimation module 520 of the first server, as shown at 632. The working time estimation module 520 determines an estimated time for completing the task and returns the estimated time to the task scheduler, as shown at 634. The working time estimation module 520 may determine the estimate based on one or more techniques, such as a number of lines of code associated with the task, amount of memory associated with the task, or any other parameters associated with the task.

The task scheduler module 540 compares the returned work time estimate with the performance requirement provided by the client 410, and determines if the performance requirement is being met, as shown at 640. If the performance requirement is being met, the task scheduler 640 has completed allocation of the task from the client. Else, if the performance requirement is not being met, the task scheduler module 540 allocates the task to a next server, for example the second server, from the first server, as shown at 640. In one or more examples, the task scheduler module 540 does not deallocate the task from the first server at this time, rather simulates allocation of the task to the second server. Further, in one or more examples, the task scheduler module 540 simulates allocating the task to each of the other servers in the set of replica servers. Thus, in the above example with three servers in the set, the task scheduler module 540 allocates the task to the second server and the third server.

The task scheduler module 540 sends a work time estimation request to the work time estimation module 520 of the second server to which the task is now allocated, as shown at 642. The working time estimation module 520 of the second server determines an estimated time for completing the task and returns the estimated time to the task scheduler 540, as shown at 644. In one or more examples, if the task scheduler simulates all of the remaining servers in the set of replica servers simultaneously, the task scheduler module 540 sends the work time estimation request to each of the second server and the third server, and receives the work time estimations from both, as shown at 642 and 644.

Based on the work time estimations from the second server and the third server, the task scheduler module 540 determines if the performance requirement can be satisfied by any of the two servers, as shown at 650. If the performance requirement can be met by one of the two servers, say the second server, the task scheduler module 540 relocates the task to the second server that already has a copy of the data block that the task uses. Thus, data reallocation is not performed in this case.

Else, if neither of the two servers—the second server and the third server—can satisfy the performance requirement, the task scheduler module 540 requests relocating the data from the first server to a new server accessible by the cloud-computing platform, as shown at 650 and 660. The task scheduler module 540 sends the request for relocation of data to the reallocation manager module 510. In response, the reallocation manager module 510 selects the new server and moves the data from the first server to the new server, as shown at 662. Further, the task scheduler module 540 moves the task from the first server to the new server, as shown at 664. Thus, the system facilitates reallocating data and task in a cloud-computing platform such as a SPARK™ based cluster of servers.

Figure 7:
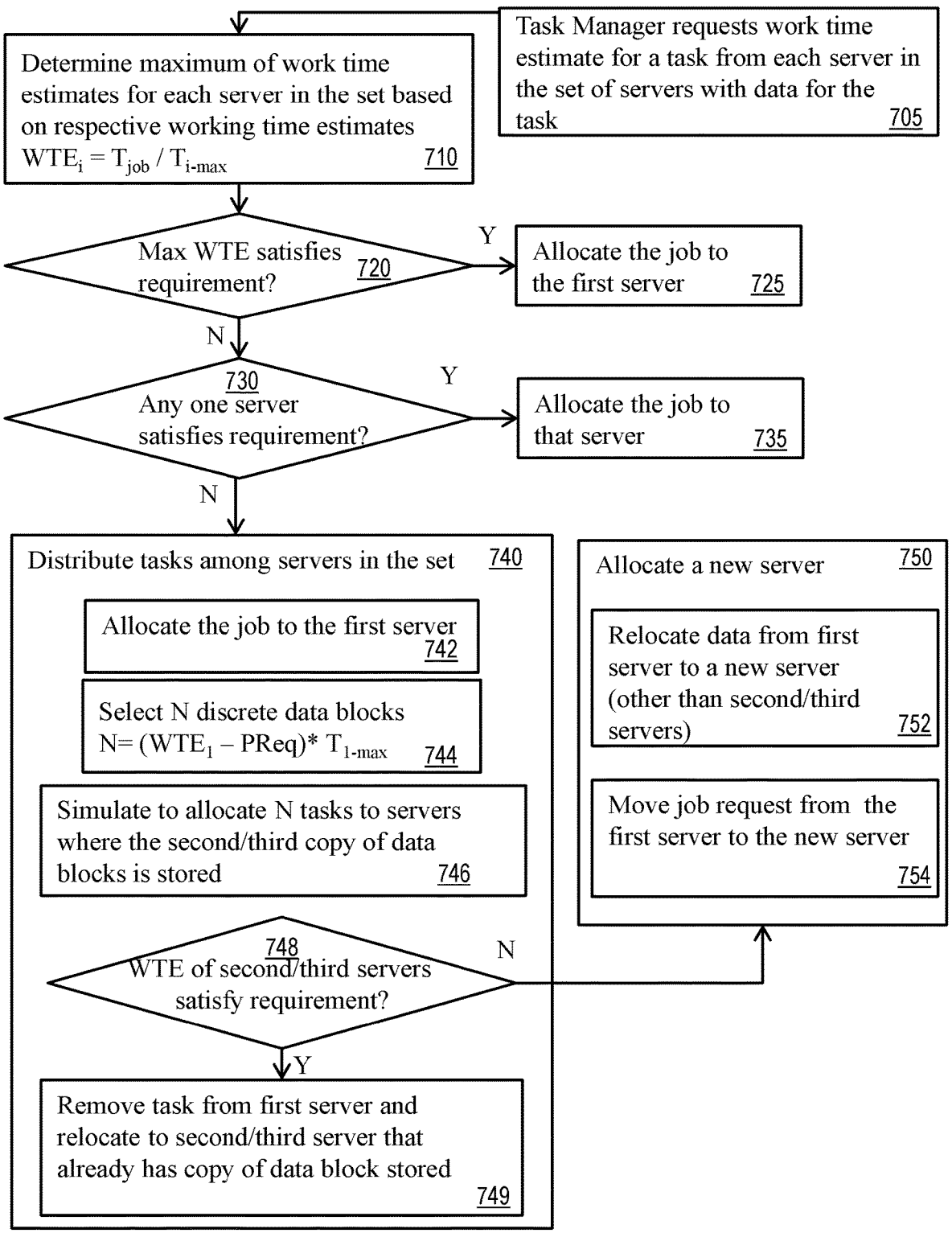
FIG. 7 illustrates a flowchart for an example method for relocating tasks and data from a job request in a computer cluster according to one or more embodiments.

FIG. 7 illustrates a flowchart for an example method for relocating tasks and data from a job request in a computer cluster, or a cloud-computing platform that includes multiple servers 430 as the computing nodes. In one or more examples, upon receiving a job request from the client 410, the task manager 430M requests work time estimate for a task from each server 430 in the set of replica servers, as shown at 705. In one or more examples, the requested job may include multiple tasks. The requested job may further be associated with a performance requirement that specifies a time limit for completing all of the tasks in the job request. The job request may further include data to be used for the tasks. The block manager module 550 stores the data according to the data storage scheme of the cloud-computing platform. For example, the data is stored in a predetermined number of servers, for example three, in the cluster of servers. Alternatively, or in addition, the job request identifies data that is already stored in the cloud-computing platform according to the storage scheme.

Accordingly, the job request may be initially associated with the set of replica servers that have the data for executing the tasks from the job request. For example, the set of replica servers may include a first server and two (or any other number) backup servers that maintain a copy of the data from the first server. Alternatively, the set of replica servers may include a predetermined number of servers (e.g. three) across which the cloud-computing platform, such as SPARK™, maintains a copy of the data.

The task scheduler module 540 may send the request to the work time estimation module 520 of each server 430 from the set of replica servers. Each of the servers 430 in the set computes a respective working time estimate for the task, as shown at 710. For example, the working time estimation module 520 computes the working time estimate for a task. For example, the working time estimation module 520 of server, from the set computes the estimate as $WTE_i=T_{job}/T_{i-max}$, where $T_{iob}$ is a number of tasks in the job request, and $T_{i-max}$ is the maximum number of simultaneous tasks that the server, can handle at this time, based on current load of the server$_i$. For example, if the job request includes 50 tasks ($T_{job}$=50) and if a first server, server, can currently execute 4 tasks ($T_{1-max}$=4) in parallel, $WTE_1$=50/4=12.5. Similarly, consider that the set of replica servers has three servers with the remaining two servers have $T_{2-max}$=5, and $T_{3-max}$=3, resulting in $WTE_2$=10 and $WTE_3$=16.7. In one or more examples, the work time estimation module 520 of the server, generates the estimate based on information associated with the server$_i$, like data block distribution and past performance of server, once data import from client 410 is complete. The task scheduler module 540 determines a maximum WTE from among the work time estimations from each of the servers in the set.

In one or more examples, the each replica server server, determines the work time estimate based on a number of tasks that are already allocated to or that are being executed by the server$_i$, and $T_{max}$ is the maximum number of simultaneous tasks that the server, can handle, which may be a predetermined configurable setting of the server$_i$. In one or more examples, the work time estimation module 520 of the server, generates the estimate based on information associated with the server, like data block distribution and past performance of server, once data import from client 410 is complete. The task scheduler module 540 determines a maximum WTE from among the work time estimations from each of the servers in the set.

The task scheduler module 540 further determines if the maximum work time estimate from the set of replica servers satisfies the performance requirement of the job request, as shown at 720. For example, the task scheduler module 540 checks if the maximum work time estimate is smaller than or equal to a time limit specified by the client 410 for the job request. If the performance requirement is being met by even the maximum work time estimate, the task scheduler module 540 allocates all the tasks from the job request to the first server from the set of replica servers, as shown at 725. For instance, in the above example, $WTE_{max}$=max(12.5, 10, 16.7)=16.7. If the performance requirement is PReq=20, the task scheduler module 540 may schedule all of the tasks from the job requests to any of the servers from the set of replica servers, and still meet the performance requirement. In such a case, the task scheduler module 540 allocates the job request to the server with the least execution cost, for example based on maintenance cost, power consumption, and other such metrics.

Else, if the maximum work time estimate does not satisfy the performance requirement of the task, the task scheduler module 540 allocates the job request to the first server from the set of replica servers and determines a number tasks that may be relocated to the other servers from the set. It should be noted that the first server in this case is just exemplary, and that in other examples, the second or the third server may be used based on the server selection policy.

For instance, in the above example, consider that the $T_{1-max}$ for the first server is 2 (instead of 4), which results in $WTE_1$=50/2=25, which is above the PReq=20. Thus, the performance requirement is not met.

The task scheduler determines if any one of the servers from the set can satisfy the performance requirement based on the $WTE_i$, as shown at 730. For example, in the above example, any one of the second server with $WTE_2$=10 and the third server with $WTE_3$=16.7 can meet the performance requirement. Accordingly, the task scheduler module 540 allocates all of the tasks from the job to any one of the second and third servers in this case based on the server selection policy, such as based on the operating costs for the server, as shown at 735.

Else, if none of the servers from the set of replica servers with the copy of the data for the job request can meet the performance requirement individually, the task scheduler module 540, checks if the tasks from the job request can be distributed among the servers from the set of replica servers with the copies of the data, as shown at 740.

For the distribution, the task scheduler module 540 allocates the job request to the first server, as shown at 742. The first server may be selected based on the least operating cost, or any other parameter(s) in the server selection policy. Further, the task scheduler module 540 determines a number of discrete data blocks from the job request to be distributed to meet the PReq, as shown at 744. The task scheduler module 540 further simulates allocating the N tasks of the job request to the second and/or third servers from the set of replica servers, as shown at 746.

For example, the task scheduler module 540 selects N discrete data blocks, N=($WTE_1$−PReq)*$T_{1-max}$. Thus, in case of the ongoing example, N=(25−20)*2=10. Accordingly, by allocating the job request to the server, and distributing N=10 tasks from the job requests to other servers in the set can satisfy the PReq, depending on the maximum tasks that the other servers can handle. In the ongoing examples, allocating the remaining N=10 tasks to the second server results in $WTE_2=N/T_{2-max}=10/5=2$, and similarly allocating the N=10 tasks to the third server results in $WTE_3=N/T_{3-max}=10/3=3.3$. In this case, by distributing the N=10 tasks to the second and/or the third servers the $WTE_1$ for the first server in this case can be reduced to $(T_{job}-N)/T_{1-max}=(50-10)/2=20$. Thus, the PReq=20 can be met by such redistribution.

In one or more examples, the task scheduler module 540 may distribute the tasks across all of the servers in the set. For example, the first server, the second server, and the third server, which all have copies of the data are used for executing one or more of the tasks from the job request, such that the sum of the tasks being executed by each of the servers is the total number of tasks from the job request.

The task scheduler module 540, based on the simulation, checks if the work time estimations from the second and/or third servers satisfy the performance requirement, as shown at 748. If the distribution satisfies the performance requirement, the task scheduler module 540 removes the N tasks from the first server and allocates those tasks to the second and/or third servers.

Else, if the distribution of the tasks across the set of replica servers does not satisfy the performance requirement, the task scheduler module 540 allocates a new server, other than those in the set, as shown at 750. The new server may be a physical server in the cloud-computing platform. Alternatively, the new server may be a virtual server, for example, launched using a hypervisor. Allocating the new server further includes relocating data from the first server to the new server, as shown at 752. Further, the job request is moved from the first server to the new server, as shown at 754. The new server is then allocated to complete all of the tasks from the job request. In case the new server is unable to satisfy the performance requirement, the task scheduler module 540 executes the above method with the new server as the first server.

For example, referring to FIG. 5, the reallocation manager module 510 requests allocation of the new server 430N. Once the new server 430N has been allocated, the reallocation manager module 510 requests the data reallocator modules from the first server and the new server 430N to migrate the data. The task scheduler module 540 migrates the tasks from the first server to the new server 430N. Further yet, the data reallocator module 530N analyzes user performance preference from history records to persist data in the first server.

In one or more examples, the servers 430 facilitate persisting (or caching) a dataset in memory across operations. For example, in platforms that use resilient distributed datasets (RDD), such as SPARK™, when an RDD is persisted, each server stores any partitions of the RDD that the server computes in memory and reuses them in other actions on that dataset (or datasets derived from it). This allows future actions to be much faster (for example, by more than 10×). Caching is thus a key tool for iterative algorithms and fast interactive use in RDD based cloud-computing platforms, such as the system herein.

Figure 8:
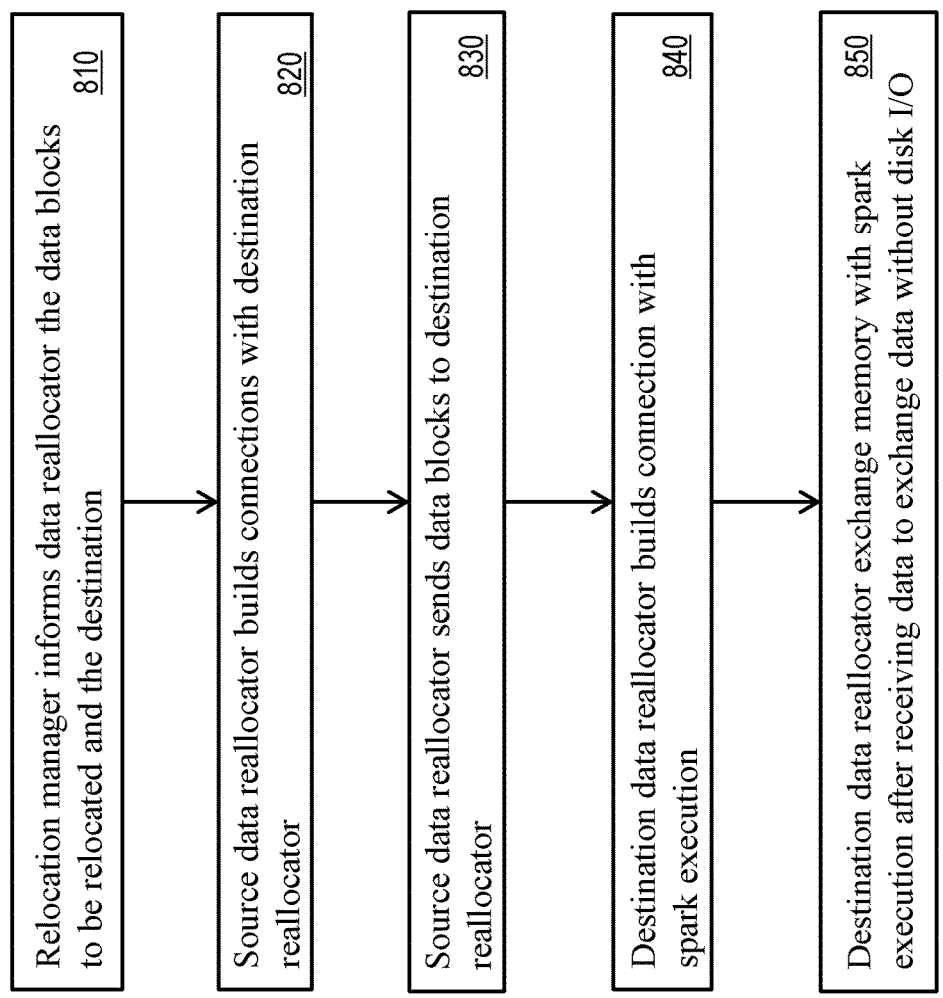
FIG. 8 illustrates a flowchart for an example method for the data reallocation in a computer cluster according to one or more embodiments.

FIG. 8 illustrates a flowchart for an example method for data reallocation in a computer cluster according to one or more embodiments. In one or more examples, the reallocation manager module 510 requests the data reallocator module 530A of the first server 430A to migrate the data blocks corresponding to the data being used by the job request from the client 410, as shown at 810. The reallocation manager module 510 informs the data reallocator module 530A of the new server 430N as the destination.

The source data reallocator, in this case the data reallocator module 530A builds a communication connection with the destination data reallocator, in this case the data reallocator module 530N of the new server 430N, as shown at 820. The source data reallocator 530A sends the data blocks to the destination data reallocator 530N via the built connections, as shown at 830. The migrated data blocks are stored in memory at the new server 430N, and not written into the disk of the new server 430N, at this time. The destination reallocator module 530N creates a communication connection with the cloud-computing execution engine, such as the SPARK™ executor, as shown at 840. The destination data reallocator 530N exchanges memory with the execution engine after receiving the data from the source data reallocator 530A so as to exchange data without the disk I/O.

Further yet, after the data relocation to the new server 430N, the cloud-computing platform has to configure the data persistence of the data blocks that are migrated. In one or more examples, the data persistence on the new server 430N is configured based on user performance requirements.

Figure 9:
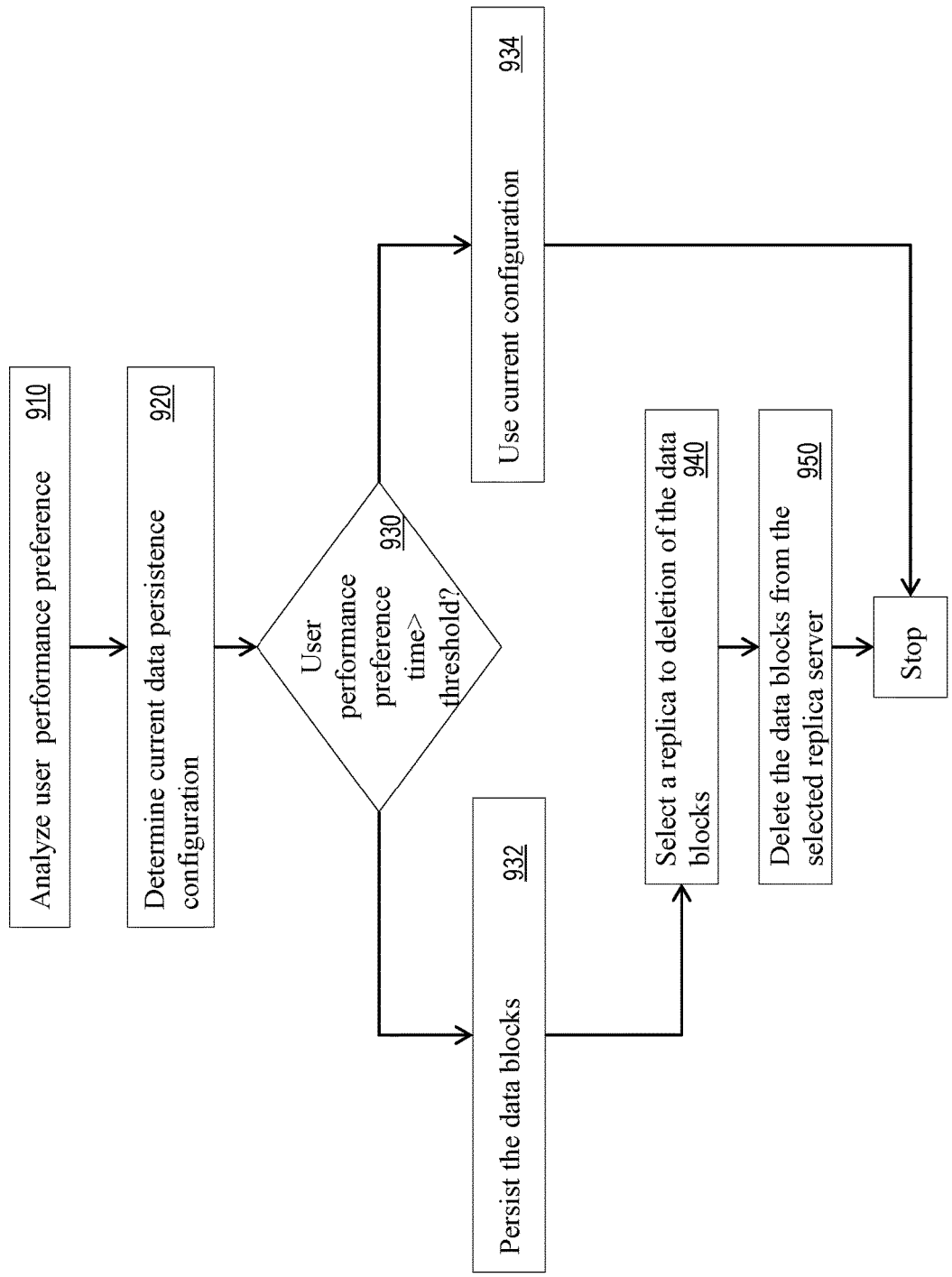
FIG. 9 illustrates a flowchart of an example method to configure data persistence of migrated data on a new server according to one or more embodiments.

FIG. 9 illustrates a flowchart of an example method to configure the data persistence of the migrated data on the new server 430N, according to one or more embodiments. The data blocks if persisted are maintained in the memory, without disk I/O, which in turn facilitates saving the time required for the disk I/O. For example, the task scheduler module 540 analyzes client performance preference from historic records of the client 410, as shown at 910. For example, the task scheduler module 540 determines an average performance requirement, or a median performance requirement that the client 410 provides based on the historic data. The historic data may be stored in a repository by the cloud-computing platform. Task scheduler sends the determined user performance preference information to the reallocation manager module 510. In addition, the data reallocator module 530N of the new server 430N informs the reallocation manager module 510 of the current data persistence configuration of the migrated data blocks, as shown at 920. The current data persistence configuration may be the data persistence that was used in the first server 430A from which the data blocks were migrated (as described herein.)

The relocation manager determines whether to persist the migrated data according to user performance preference, as shown at 930. For example, if the user performance preference is to complete execution of the job requests in less than a predetermined threshold amount of time, the reallocation manager module 510 persists the data blocks to the disk in the new server Else, if the user performance preference is above the threshold amount of time, the reallocation manager module 510 does not persist the data blocks in the new server 430N, and rather continues to use the current configuration, as shown at 934. If the data blocks are persisted in the new server, the reallocation manager module 510 selects one of the replications of the data blocks for deletion, as shown at 940. For example, the reallocation manager module 510 selects one of the first server 430A, the second server 430B, and the third server 430C for deleting the data blocks. The selection may be based on the operating costs or any other parameters, such as disk space available at the servers 430. The reallocation manager module 510 indicates to the block manager module 550 the selection, which in turn deletes the data blocks from the selected server, as shown at 950. Thus, the number of replicas of the data blocks in the cloud-computing platform remains compliant with the predetermined configuration, in this case three.

Using the implementations described herein, the performance of a cloud-computing platform is improved. For example, table 1 illustrates improvements achieved by relocating tasks and data using the technical features of the solutions described herein. The results demonstrate that the data distribution and other technical features described herein improve performance of a cloud-computing platform such as a SPARK™ based system.

TABLE 1

| Amount of Data | 1 node (4 regions) Task Execution Time/Client Response Time (s) | 1 node (8 regions) Task Execution Time/Client Response Time (s) | 2 nodes (10 regions) Task Execution Time/Client Response Time (s) | 4 nodes (10 regions) Task Execution Time/Client Response Time (s) |
|---|---|---|---|---|
| 2000000 | 7.3/112.4 | 8.3/119.8 | 8.4/123.5 | 6.5/103.3 |
| 1500000 | 4.7/79.8 | 6.2/86.8 | 6.5/91 | 5.0/82 |
| 1300000 | 4.1/72.6 | 5.3/77.6 | 5.6/80 | 4.7/75.2 |
| 1000000 | 2.4/56.5 | 4.2/68 | 3.1/69.6 | 2.2/58.4 |
| 800000 | 2.1/45.4 | 3.1/53.2 | 2.8/55.6 | 1.9/51.1 |
| 500000 | 2.0/33.6 | 2.5/37.9 | 2.1/35.3 | 1.5/37.2 |
| 100000 | 1.1/16.6 | 2.2/20.8 | 1.6/17.3 | 0.9/16.9 |

The technical features described herein facilitate distributing data among one or more servers in a cluster, where the data that is being used for executing a job requested by a client of the cluster. The technical features facilitate distributing the data based on a predetermined number of replica servers used by the cluster. The technical features further facilitate persisting the data based on user performance preference after migrating the data.

Thus, the technical features herein facilitate a reallocation of tasks from one server to another server within a server cluster. However, migrating only the tasks results in the tasks reading data from the original server. Hence, the technical features herein migrate the data blocks for the tasks to the new server, so that once the migration is complete, the task will read data from the local node. Further, the data continues to reside on the new server when tasks are completed, so as to improve the performance of the next job request.

By implementing the technical features herein a cloud-computing platform, such as a SPARK system migrates data and tasks for a job according to the performance needs specified by users of the system. Before the job is executed, the system schedules the tasks in the job according to the data location on compute nodes (servers) within the cluster. If the data used by multiple jobs is distributed in the same node, multiple jobs running on the same node at the same time will affect the response time of job. Hence, the technical features herein facilitate the system to determine whether the performance requirement can be met by the current estimated work time, and in such a case default data and task distribution strategy will be used. If the performance requirement is high, and if the estimate-time of the job cannot meet the performance requirement, the system selects part of data and migrates to a new node so that tasks from the job are distributed with the new node. When the job is complete, the system can decide to delete the original data or keep it according to the performance requirements.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer implemented method for optimizing operation of a server cluster, the method comprising:
   receiving a job request that uses a set of data blocks, the job request being associated with an expected completion time;
   using a task scheduler module to identify a set of replica servers that include data blocks for a task by querying a block manager module, wherein each server from the set of replica servers contains the set of data blocks;
   in response to each server from the set of replica servers estimating a completion time for the job request that is more than the expected completion time: initiating a new server;
   relocating the set of data blocks from a first server from the set of replica servers to the new server; and
   allocating the job request to the new server.

2. The computer implemented method of claim 1, wherein the job request comprises one or more parallel tasks.

3. The computer implemented method of claim 1, wherein relocating the set of data blocks from the first server from the set of replica servers to the new server comprises:
 deleting the set of data blocks from the first server in response to relocating the set of data blocks to the new server.

4. The computer implemented method of claim 1, wherein relocating the set of data blocks from the first server from the set of replica servers to the new server comprises:
 persisting the set of data blocks in the new server, wherein persisting the set of data blocks comprises maintaining the set of data blocks in a memory.

5. The computer implemented method of claim 4, wherein the set of data blocks are persisted based on the expected completion time being lesser than a threshold.

6. The computer implemented method of claim 5, wherein, in response to the expected completion time being greater than or equal to the threshold, the set of data blocks are written into a disk.

7. The computer implemented method of claim 1, wherein the set of replica servers has a predetermined number of servers.

8. The computer implemented method of claim 1, wherein the method further comprises:
 estimating the completion time for the job request by simulating a distribution of a plurality of tasks from the job request among the set of replica servers.

9. A system comprising:
 a server cluster configured to:
 receive a job request that uses a set of data blocks, the job request being associated with an expected completion time;
 use a task scheduler module to identify a set of replica servers that include data blocks for a task by querying a block manager module, wherein each server from the set of replica servers contains the set of data blocks;
 in response to each server from the set of replica servers estimating a completion time for the job request that is more than the expected completion time:
 initiate a new server;
 relocate the set of data blocks from a first server from the set of replica servers to the new server; and
 allocate the job request to the new server.

10. The system of claim 9, wherein relocating the set of data blocks from the first server from the set of replica servers to the new server comprises:
 deleting the set of data blocks from the first server in response to relocating the set of data blocks to the new server.

11. The system of claim 9, wherein relocating the set of data blocks from the first server from the set of replica servers to the new server comprises:
 persisting the set of data blocks in the new server, wherein persisting the set of data blocks comprises maintaining the set of data blocks in a memory.

12. The system of claim 11, wherein the set of data blocks are persisted based on the expected completion time being lesser than a threshold.

13. The system of claim 12, wherein, in response to the expected completion time being greater than or equal to the threshold, the set of data blocks are written into a disk.

14. The system of claim 9, wherein the set of replica servers has a predetermined number of servers.

15. The system of claim 9, wherein the server cluster is further configured to estimate the completion time for the job request by the set of replica servers by:
 estimating respective the completion time by each server from the set of replica servers; and
 estimating the completion time for the job request by simulating a distribution of a plurality of tasks from the job request among the set of replica servers.

16. A computer program product for executing a job request by a server cluster, the computer program product comprising a computer readable non-transitory storage medium, the computer readable non-transitory storage medium having program instructions embodied therewith, the program instructions executable by a processor to cause the processor to:
 receive a job request that uses a set of data blocks, the job request being associated with an expected completion time;
 use a task scheduler module to identify a set of replica servers that include data blocks for a task by querying a block manager module, wherein each server from the set of replica servers contains the set of data blocks;
 in response to a server from the set of replica servers estimating a completion time for the job request that is more than the expected completion time:
 initiate a new server;
 relocate the set of data blocks from a first server from the set of replica servers to the new server; and
 allocate the job request to the new server.

17. The computer program product of claim 16, wherein relocating the set of data blocks from the first server from the set of replica servers to the new server comprises:
 deleting the set of data blocks from the first server in response to relocating the set of data blocks to the new server.

18. The computer program product of claim 16, wherein relocating the set of data blocks from the first server from the set of replica servers to the new server comprises:
 persisting the set of data blocks in the new server, wherein persisting the set of data blocks comprises maintaining the set of data blocks in a memory, wherein the set of data blocks are persisted based on the expected completion time being lesser than a threshold, and in response to the expected completion time being greater than or equal to the threshold, the set of data blocks are written into a disk.

19. The computer program product of claim 16, wherein:
 the set of replica servers has a predetermined number of servers; and
 the server cluster maintains the predetermined number of servers in the set of replica servers by deleting the set of data blocks from the first server in response to relocating the set of data blocks to the new server.

20. The computer program product of claim 16, wherein the program instructions executable by a processor further cause the processor to estimate the completion time for the job request by simulating a distribution of a plurality of tasks from the job request among the set of replica servers.

* * * * *